United States Patent
Petrovic et al.

(10) Patent No.: US 6,175,627 B1
(45) Date of Patent: *Jan. 16, 2001

(54) APPARATUS AND METHOD FOR EMBEDDING AND EXTRACTING INFORMATION IN ANALOG SIGNALS USING DISTRIBUTED SIGNAL FEATURES

(75) Inventors: Rade Petrovic, Wilmington; Kanaan Jemili, Woburn; Joseph M. Winograd, Cambridge; Eric Metois, Somerville, all of MA (US)

(73) Assignee: Verance Corporation, San Diego, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/974,920

(22) Filed: Nov. 20, 1997

Related U.S. Application Data

(63) Continuation-in-part of application No. 08/858,562, filed on May 19, 1997, now Pat. No. 5,940,135.

(51) Int. Cl.[7] .................................................. H04N 7/087
(52) U.S. Cl. .......................... 380/42; 380/252; 380/253; 380/254
(58) Field of Search .............................. 380/3, 4, 6, 8, 380/252, 253, 254, 42; 713/176

(56) References Cited

U.S. PATENT DOCUMENTS

| | | | |
|---|---|---|---|
| 4,497,060 | * | 1/1985 | Petrovic et al. ..................... 348/473 |
| 4,876,617 | * | 10/1989 | Best et al. .............................. 360/60 |
| 4,937,807 | * | 1/1990 | Weitz et al. ........................... 369/85 |
| 4,972,471 | | 11/1990 | Gross et al. . |
| 5,113,437 | * | 5/1992 | Best et al. ............................... 380/3 |
| 5,319,735 | * | 6/1994 | Preuss et al. ........................ 704/205 |
| 5,379,345 | * | 1/1995 | Greenberg ............................. 380/23 |
| 5,404,377 | * | 4/1995 | Moses .................................. 375/200 |
| 5,450,490 | * | 9/1995 | Jensen et al. ............................. 380/6 |
| 5,473,631 | * | 12/1995 | Moses .................................. 375/202 |
| 5,612,729 | * | 3/1997 | Ellis et al. .............................. 348/2 |
| 5,613,004 | * | 3/1997 | Cooperman et al. ................. 380/28 |
| 5,687,236 | * | 11/1997 | Moskowitz et al. .................. 380/28 |
| 5,764,763 | * | 6/1998 | Jensen et al. ............................. 380/6 |
| 5,848,155 | * | 12/1998 | Cox ......................................... 380/4 |
| 5,850,481 | * | 12/1998 | Rhoads ................................ 382/232 |
| 5,889,868 | * | 3/1999 | Moskowitz ............................ 380/51 |
| 5,893,067 | * | 4/1999 | Bender et al. ....................... 704/502 |
| 5,930,369 | * | 7/1999 | Cox et al. ............................. 380/54 |
| 5,933,798 | * | 8/1999 | Linnartz .............................. 702/191 |
| 5,940,135 | * | 1/1985 | Petrovic et al. ..................... 348/473 |

FOREIGN PATENT DOCUMENTS

| | | |
|---|---|---|
| 2260246 | 4/1993 | (GB) . |
| 2292506 | 2/1996 | (GB) . |

OTHER PUBLICATIONS

Bruce Schneier, Applied Cryptography, Second Edition: Protocols, Algorithms and Source Code in C, pp. 9–10, 29–31, 79–80., Oct. 1995.*

Arthur F. Coxford, Advanced Mathematics: A Preparation for Calculus, Second Edition, 35–46, 1978.*

* cited by examiner

Primary Examiner—Tariq B. Hafiz
Assistant Examiner—Michael Pender
(74) Attorney, Agent, or Firm—Rothwell, Figg, Ernst & Manbeck

(57) ABSTRACT

Apparatus and methods are provided for embedding or embedding digital data into an analog host or cover signal. A distributed signal feature of the cover signal in a particular domain (time, frequency or space) is calculated and compared with a set of predefined quantization values corresponding to an information symbol to be encoded. The amount of change required to modify the signal feature to the determined target quantization value is calculated and the cover signal is modified accordingly to so change the feature value over a predefined interval. Information symbols are extracted by the opposite process.

23 Claims, 3 Drawing Sheets

FIG.5

| frequency band | 5000Hz - 6000Hz |
|---|---|
| time intervals | T = 20-ms, sequential |
| distributed signal feature i-th symbol, i = 1, 2, .... | $\dfrac{I_{1,i} - I_{2,i}}{I_{1,i} + I_{2,i}}$, $I_{1,i} = \int_{(i-1)T}^{(i-0.5)T} s^2(t)\,dt$, $I_{2,i} = \int_{(i-0.5)T}^{iT} s^2(t)\,dt$ |
| quantization grid, binary symbols | Symbol 1: $Q_1 = -0.9, -0.5, -0.1, 0.3, 0.7$<br>Symbol 0: $Q_0 = -0.7, -0.3, 0.1, 0.5, 0.9$ |

APPARATUS AND METHOD FOR EMBEDDING AND EXTRACTING INFORMATION IN ANALOG SIGNALS USING DISTRIBUTED SIGNAL FEATURES

CROSS REFERENCE TO RELATED APPLICATION

This application is a continuation-in-part of pending application Ser. No. 08/858,562 filed May 19, 1997, now U.S. Pat. No. 5,940,135, and assigned to the same assignee herein.

BACKGROUND OF THE INVENTION

1. Field of the Invention

This invention relates to apparatus and methods for encoding and decoding information in analog signals, such as audio, video and data signals, either transmitted by radio wave transmission or wired transmission, or stored in a recording medium such as optical or magnetic disks, magnetic tape, or solid state memory.

2. Background and Description of Related Art

An area of particular interest to certain embodiments of the present invention relates to the market for musical recordings. Currently, a large number of people listen to musical recordings on radio or television. They often hear a recording which they like enough to purchase, but don't know the name of the song, the artist performing it, or the record, tape, or CD album of which it is part. As a result, the number of recordings which people purchase is less than it otherwise would be if there was a simple way for people to identify which of the recordings that they hear on the radio or TV they wish to purchase.

Another area of interest to certain embodiments of the invention is copy control. There is currently a large market for audio software products, such as musical recordings. One of the problems in this market is the ease of copying such products without paying those who produce them. This problem is becoming particularly troublesome with the advent of recording techniques, such as digital audio tape (DAT), which make it possible for copies to be of very high quality. Thus it would be desirable to develop a scheme which would prevent the unauthorized copying of audio recordings, including the unauthorized copying of audio works broadcast over the airwaves. It is also desirable for copyright enforcement to be able to insert into program material such as audio or video signals digital copyright information identifying the copyright holder, which information may be detected by appropriate apparatus to identify the copyright owner of the program, while remaining imperceptible to the listener or viewer.

Various prior art methods of encoding additional information onto a source signal are known. For example, it is known to pulse-width modulate a signal to provide a common or encoded signal carrying at least two information portions or other useful portions. In U.S. Pat. No. 4,497,060 to Yang (1985) binary data is transmitted as a signal having two differing pulse-widths to represent logical "0" and "1" (e.g., the pulse-width durations for a "1" are twice the duration for a "0"). This correspondence also enables the determination of a clocking signal.

U.S. Pat. No. 4,937,807 to Weitz et al. (1990) discloses a method and apparatus for encoding signals for producing sound transmissions with digital information to enable addressing the stored representation of such signals. Specifically, the apparatus in Weitz et al. converts an analog signal for producing such sound transmissions to clocked digital signals comprising for each channel an audio data stream, a step-size stream and an emphasis stream.

With respect to systems in which audio signals produce audio transmissions, U.S. Pat. Nos. 4,876,617 to Best et al. (1989) and 5,113,437 to Best et al. (1992) disclose encoders for forming relatively thin and shallow (e.g., 150 Hz wide and 50 dB deep) notches in mid-range frequencies of an audio signal. The earlier of these patents discloses paired notch filters centered about the 2883 Hz and 3417 Hz frequencies; the later patent discloses notch filters but with randomly varying frequency pairs to discourage erasure or inhibit filtering of the information added to the notches. The encoders then add digital information in the form of signals in the lower frequency indicating a "0" and in the higher frequency a "1". In the later Best et al. patent an encoder samples the audio signal, delays the signal while calculating the signal level, and determines during the delay whether or not to add the data signal and, if so, at what signal level. The later Best et al. patent also notes that the "pseudo-random manner" in moving the notches makes the data signals more difficult to detect audibly.

Other prior art techniques employ the psychoacoustic model of the human perception characteristic to insert modulated or unmodulated tones into a host signal such that they will be masked by existing signal components and thus not perceived. See, e.g. Preuss et al., U.S. Pat. No. 5,319,735, and Jensen et al., U.S. Pat. No. 5,450,490. Such techniques are very expensive and complicated to implement, while suffering from a lack of robustness in the face of signal distortions imposed by perception-based compression schemes designed to eliminate masked signal components.

The prior art fails to provide a method and an apparatus for encoding and decoding auxiliary analog or digital information signals onto analog audio or video frequency signals for producing humanly perceived transmissions (i.e., sounds or images) such that the audio or video frequency signals produce substantially identical humanly perceived transmission prior to as well as after encoding with the auxiliary signals. The prior art also fails to provide relatively simple apparatus and methods for encoding and decoding audio or video frequency signals for producing humanly perceived audio transmissions with signals defining digital information. The prior art also fails to disclose a method and apparatus for limiting unauthorized copying of audio or video frequency signals for producing humanly perceived audio transmissions.

SUMMARY OF THE INVENTION

The present invention provides apparatus and methods for embedding or encoding, and extracting or decoding, digitized information in an analog host or cover signal in a way which has minimal impact on the perception of the source information when the analog signal is applied to an appropriate output device, such as a speaker, a display monitor, or other electrical/electronic device.

The present invention further provides apparatus and methods for embedding and extracting machine readable signals in an analog cover signal which control the ability of a device to copy the cover signal.

In summary, the present invention provides for the encoding or embedding of a data signal in an analog host or cover signal, by modulating the host or cover signal so as to modify a distributed signal feature of the signal within the predefined region. As used herein, a "distributed signal feature" of a host or cover signal refers to a numerical property of the host or cover signal over a region (i.e., time, frequency and/or space) of interest where data embedding modulation is to be applied. The distributed feature of the host signal is modified to a predefined quantization value which corresponds to a data symbol or binary digit of the data signal to be embedded. Subsequently, the embedded data signal is recovered by detecting the modified distributed feature values and correlating the detected values with the predefined relationship between data symbols and quantized distributed feature values.

The term cover signal as used hereinafter refers to a host or source signal, such as an audio, video or other information signal, which carries or is intended to carry embedded or hidden digitized data. The terms distributed feature or signal feature as used hereinafter refer to a scalar value obtained by processing the cover signal values over the totality of the regions within domains (i.e., time, frequency and/or space) where the data-embedding modulation is applied. One desirable property for such processing is that random changes in signal magnitudes caused by noise or other signal distortions have a minimal effect on the signal feature value, while the combined effect of modulation of signal magnitudes for embedding of digitized data over a predefined region produces a measurable change in the feature value.

In particular, the present invention provides a method for embedding an information symbol in an analog cover signal, comprising the steps of calculating a distributed signal feature value of the cover signal over a predefined region, comparing the calculated signal feature value with a predefined set of quantization values corresponding to given information symbols and determining a target quantization value corresponding to the information symbol to be embedded, calculating the amount of change required in the cover signal to modify the calculated signal feature to the target quantization value, and modifying the cover signal according to the calculated amount of change.

According to another embodiment of the invention, a method is provided for extracting an information symbol embedded in an analog cover signal, comprising the steps of calculating a distributed signal feature value of the cover signal over a predefined region, comparing the calculated signal feature value with a predefined set of quantization values corresponding to given information symbols and determining which quantization value corresponds to the calculated signal feature value, and translating the determined quantization value into the information symbol contained in the cover signal and outputting the information symbol.

The present invention further provides apparatus for embedding information in accordance with the above method, and apparatus for extracting the embedded information from the cover signal.

BRIEF DESCRIPTION OF THE DRAWINGS

These and other aspects of the present invention will become more fully understood from the following detailed description of the preferred embodiments in conjunction with the accompanying drawings, in which:

FIG. 5 is a table illustrating an example of stego key 9 used for embedding and extracting digital data in an audio signal, according to one embodiment of the invention.

DETAILED DESCRIPTION OF THE PREFERRED EMBODIMENTS

The present invention is directed to a method and apparatus for embedding information or data onto a cover signal, such as an audio signal, video signal, or other analog signal, by modulating or changing the value of a distributed feature of the cover signal in a selected region of the frequency, time and/or space domains of the cover signal. The information or data to be encoded is preferably a digital or digitized signal. The invention can implemented in a number of different ways, either by software programming of a digital processor, in the form of analog, digital, or mixed-signal integrated circuits, as a discrete component electronic device, or a combination of such implementations.

Figure 1:
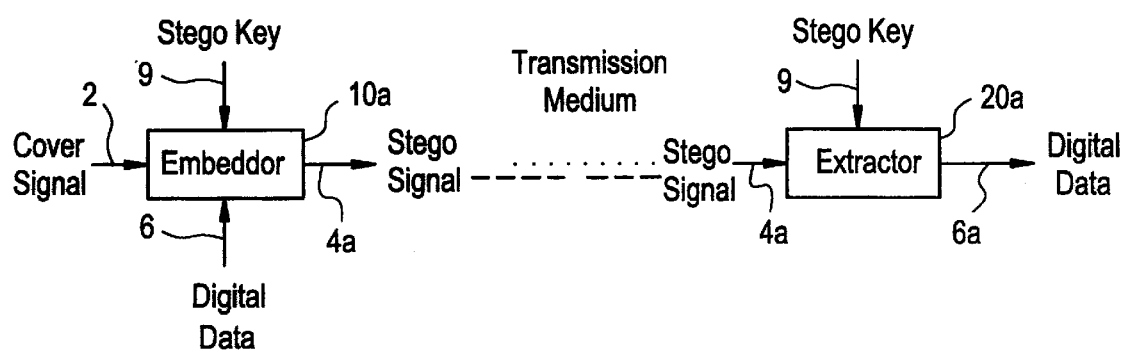
FIG. 1 is a block diagram of a data signal embedding and extracting process according to one embodiment of the present invention.

Referring to FIG. 1, the invention employs an embeddor 10 to generate a stego signal 4, which is substantially the same in terms of the content and quality of information carried by a cover signal 2. For instance, where cover signal 2 is a video or audio signal, the stego signal 4 will produce essentially the same video or audio program or information when applied to an output device such as a video display or loudspeaker.

A stego key 9 is used to determine and specify the particular region of the time, frequency and/or space domain of the cover signal 2 where the digital data 6 is to be embedded, as well as the distributed feature of the cover signal to be modified and the grid or table correlating digital data values with distributed feature quantization levels. For example, in the case of an audio signal, a particular frequency band and time interval define a region for embedding a data symbol. For a video signal, an embedding region is specified by a frequency band, a time interval in the form of an image field, frame or series of frames, and a particular area within the field or frame. FIG. 5 shows an example of the stego key specifications for frequency band, time interval, distributed signal feature, and symbol quantization grid, for an audio cover signal. Specific examples of distributed signal features are provided below.

The embeddor then appropriately modulates or modifies the cover signal to obtain a stego signal 4. Stego signal 4 can be transmitted, or stored in a storage medium such as magnetic tape, CD-ROM, solid state memory, and the like for later recall and/or transmission. The embedded digital data is recovered by an extractor 20, having knowledge of or access to the stego key 9, which operates on the stego signal 4 to extract the digital data 6.

Figure 2:
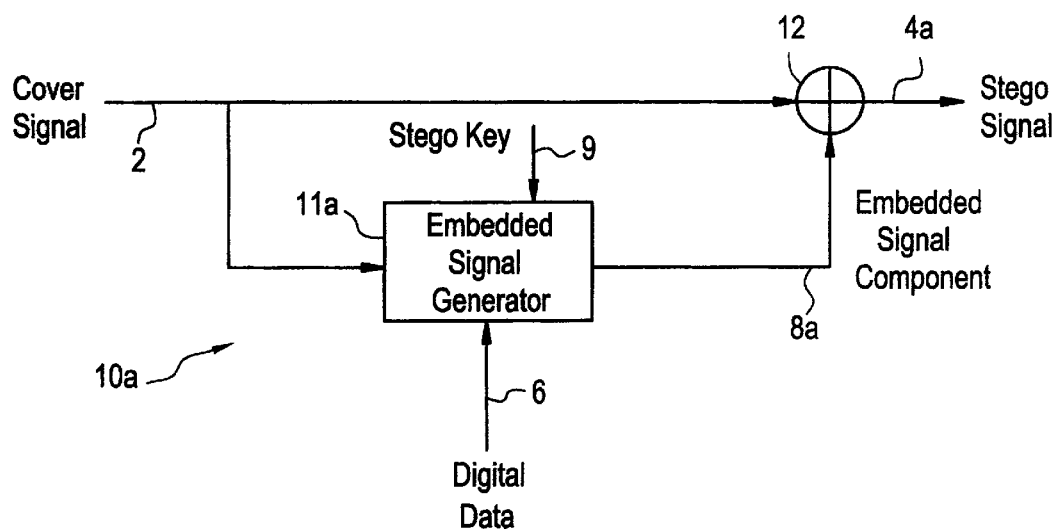
FIG. 2 is a block diagram of one embodiment of the embeddor 10 of FIG. 1.

FIG. 2 shows a block diagram of one preferred embodiment of the embeddor 10. As shown, the cover signal 2, stego key 9, and digital data 6 are inputted to an embedded signal generator 11. The embedded signal generator modulates or modifies a predefined distributed feature of the cover signal 2 in accordance with the stego key 9 and digital data 6, and generates an embedded signal 8. The cover signal 2 is then modified by adding the embedded signal 8 to the cover signal in an adder 12, to produce the stego signal 4.

Figure 3:
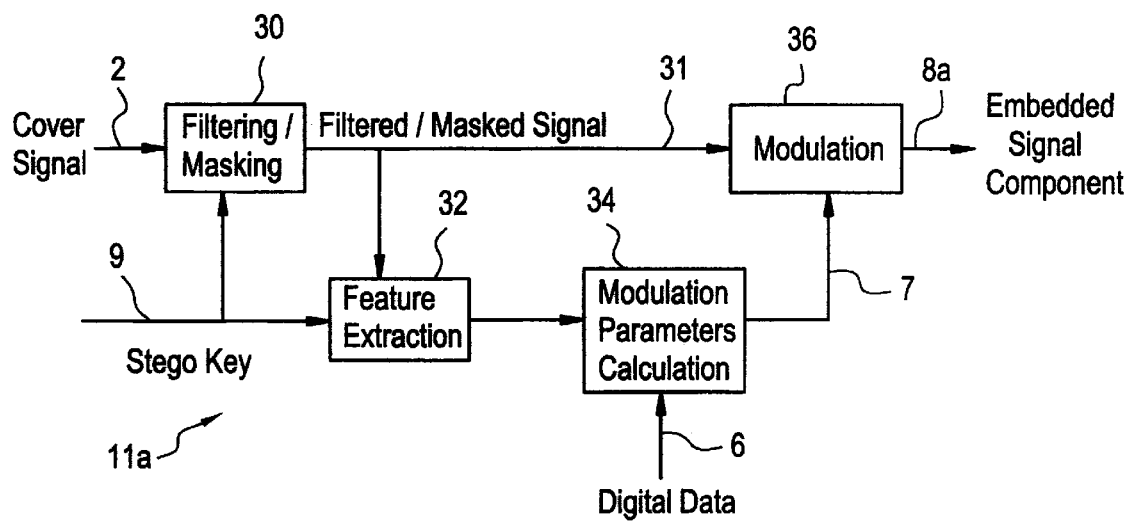
FIG. 3 is a block diagram of one embodiment of the embedded signal generator 11 of FIG. 2.

FIG. 3 illustrates the details of an embedded signal generator 11 used to generate a single embedded data signal. The cover signal 2 is filtered and/or masked in filtering/masking block 30 to produce a filtered/masked signal 31. The filtered/masked signal 31 is comprised of the selected regions of the cover signal, as specified by stego key 9, which are then used for embedding of data symbols. The signal 31 is then inputted to a feature extraction block 32, where the distributed feature to be modified, as specified by stego key 9, is extracted and provided to modulation parameter calculation module 34. Module 34 receives digital data 6 to be embedded in the cover signal, and determines the amount of modulation of the feature necessary to cause the feature to become approximately equal to the quantization value which corresponds to the digital data symbol or bit to be embedded. The calculation result 7 is then applied to modulation module 36, which modifies the filtered signal 31 to obtain the appropriate embedded signal component 8. The embedded signal component 8 is then added to the cover signal in adder 12 as shown in FIG. 2, to obtain the stego signal 4.

It is further possible to embed multiple digital data signals in the cover signal 2, by using multiple embedded signal generators, each using a different stego key to modify a different feature of the cover signal and/or to use different regions of the cover signal, so as to produce multiple embedded signal components each of which are added to the cover signal 2. Alternatively, the different data signals may be embedded in a cascade fashion, with the output of one embeddor becoming the input of another embeddor using a different stego key.

According to an alternate embodiment, the filtering/masking module 30 may be eliminated. In this case, the cover signal is directly modified by the embedded signal generator to produce the stego signal. Accordingly, the adder 12 of FIG. 2 would not be required in this alternate embodiment.

Figure 4:
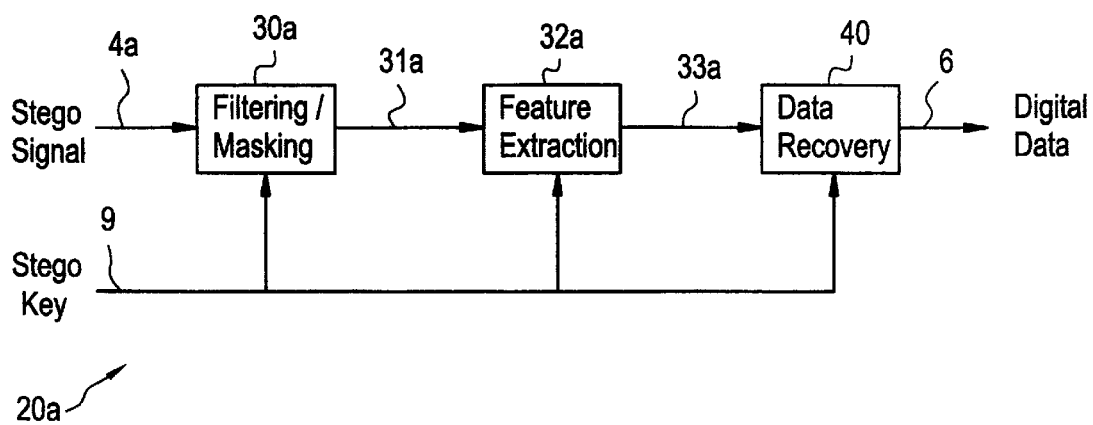
FIG. 4 is a block diagram of one embodiment of the data signal extractor 20 according to the present invention.

A block diagram of an extractor used to recover the digital data embedded in the stego signal is shown in FIG. 4. The stego signal is filtered/masked in filter/mask module 30$a$ to isolate the regions where the digital data is embedded. The filtered signal 31$a$ is inputted to feature extraction module 32$a$ where the feature is extracted. The extracted feature 33$a$ is then inputted to data recovery module 40 where the extracted feature is mapped to the quantization table or grid correlating quantized feature values with specific data symbols. A multiplicity of extracted data symbols is then subjected to well-known error detection, error correction, and synchronization techniques to verify the existence of an actual message and proper interpretation of the content of the message. Specific examples of cover signal distributed feature modulation to embed data are given hereinafter.

FIRST EXAMPLE

In this example, the cover signal 2 is an audio signal. In this embodiment, the audio signal is first filtered to isolate a specific frequency band to be used for embedding a particular data message, to produce a filtered audio signal $s(t)$. Other frequency bands can be used to embed other messages, either concurrently or in a cascaded processing technique. In addition, restricting the frequency band to be modulated to only a fraction of the overall signal spectrum reduces the effect of such modulation on the host or cover signal. The filtering step may be omitted, however, without affecting either the efficiency of the embedding process or the robustness of the embedded data.

Next, a function $f(s(t))$ of the filtered audio signal $s(t)$ is calculated as follows:

$$f(s(t)) = [abs\ (s(t))] \qquad (1)$$

where abs( ) denotes an absolute value calculation, and $\alpha$ is a parameter. Systems using $\alpha=1$ and $\alpha=0.5$ have been successfully implemented by the present inventors.

Next, the function $f(s(t))$ is integrated over successive time intervals of length T to obtain:

$$I_i = \int_{(i-1)T}^{iT} f(s(t))dt \qquad (2)$$

where the interval T corresponds to the duration of a symbol.

In the fourth step, the distributed feature $F_i$ for the i-th symbol is calculated according to the following:

$$F_i = \frac{I_i}{\sum_{n=1}^{N} I_{i-n}(1+g_{i-n})^\alpha} \qquad (3)$$

where $g_j$, $j=1, 2, \ldots, N$ are gain values calculated for N previous symbols, as shown below.

In the next step, the feature value $F_i$ is compared to a set of quantization levels belonging to a particular symbol, as defined by the stego key 9. The quantization level nearest to $F_i$ is determined. For example, in the case of binary digits, there are two sets, $Q_0$ and $Q_1$, corresponding to bits "0" and "1" respectively. The set of quantization levels for each set $Q_0$ and $Q_1$ are defined as:

$$Q_0 = q(2\kappa\epsilon),\ \kappa=0,1,2,\ldots \qquad (4)$$

$$Q_1 = q((2\kappa+1)\epsilon),\ \kappa=0,1,2,\ldots$$

where $\epsilon$ is the quantization interval that determines the robustness/transparency tradeoff, while $q(x)$ is a monotonic function. Systems using $q(x)=x$ and $q(x)=\log(x)$ have been successfully implemented.

Next, the gain value $g_i$ to be applied in the i-th symbol interval is calculated according to:

$$g_i = (Q_i/F_i)^{1/\alpha} - 1 \qquad (5)$$

where $Q_i$ is the nearest element of the quantization set belonging to the i-th symbol.

In the following step, the gain $g_i$ is applied to all signal amplitudes in the i-th symbol interval and the result is added back into the audio cover signal. Alternatively, this gain can be applied fully only in the middle portion of the symbol interval, and being tapered off toward the ends of the symbol interval. This approach reduces perception of the signal modification at the expense of a slight reduction in symbol robustness.

In order to extract the embedded data, the extractor first filters the stego signal in the same manner as the embeddor, which is defined by the stego key 9. Next, the feature is calculated according to equations (1) to (3), where it is assumed that the time interval T is known in advance as specified by the stego key 9, and the beginning of the embedded message coincides with the start of the extracting process.

In the next step, the embedded data symbols are extracted by mapping the calculated feature values to the quantization table or grid as defined by equation (4) (provided by the stego key 9), finding the closest match, and translating the quantization value into the corresponding symbol.

In the following step, consecutive extracted symbols are strung together and compared with a set of possible messages. If a match is found, the message is outputted to a user, or to a higher data protocol layer. If no match is found, repeated attempts at extraction are performed, by slightly shifting the starting time of the message by dT, which is a small fraction of the interval T (e.g., 0.01T to 0.1T).

SECOND EXAMPLE

In this example, after a filtering/masking step similar to the first example, a function $f(s(t))$ of the filtered audio signal $s(t)$ is calculated according to the following:

$$f(s(t))=s^{2m}(t) \quad (6)$$

where m is an integer. Systems using m=1 and m=2 have been successfully implemented.

Next, two integrals are respectively generated over the first half and the second half of the i-th symbol interval:

$$I_{1,i} = \int_{(i-1)T}^{(i-0.5)T} f(s(t))dt, \quad (7)$$

$$I_{2,i} = \int_{(i-0.5)T}^{iT} f(s(t))dt$$

In the following step, the distributed feature $F_i$ for the i-th symbol is calculated according to:

$$F_i = \frac{I_{1,i} - I_{2,i}}{I_{1,i} + I_{2,i}} \quad (8)$$

Next, the calculated feature $F_i$ is compared to a predefined set of quantization values for the given symbol to be embedded, and the nearest quantization value is chosen. In this embodiment, the sets $Q_0$ and $Q_1$ of quantization values for binary digit symbols "0" and "1" are defined as:

$$Q_0=q((2\kappa+0.5)\epsilon), \kappa=0,\pm1,\pm2,\ldots \quad (9)$$

$$Q_1=q((2\kappa-0.5)\epsilon), \kappa=0,\pm1,\pm2,\ldots$$

where $\epsilon$ is the quantization interval that determines the robustness/transparency tradeoff, while $q(x)$ is a monotonic function. Successful implementations have been performed for $q(x)=x$ and $q(x)=x+\epsilon/2$.

In the next step the gain $g_i$ to be applied in the i-th symbol interval is calculated according to:

$$g_i \approx \frac{1}{2m} \frac{Q_i - F_i}{1 - Q_i F_i} \quad (10)$$

where $Q_i$ is the nearest element of the quantization set belonging to the i-th symbol. Equation (10) is derived as an approximation that holds well for small values of $g_i$ and reduces the amount of computation with respect to an exact formula, with negligible effects on system robustness.

Next, the calculated gain $g_i$ is applied to all signal amplitudes in the i-th symbol interval and the result is added back into the cover signal. Alternatively, the gain is applied fully only in the middle portion of the interval, and is tapered toward the ends of the interval.

The extractor process follows an analogous sequence to that described above for the first example.

The invention having been thus described, it will be apparent to those skilled in the art that the same may be varied in many ways without departing from the spirit and scope of the invention. Any and all such modifications as would be apparent to those skilled in the art are intended to be covered by the following claims.

What is claimed is:

1. A method for embedding an information symbol in an analog cover signal, comprising the steps of:

selecting a distributed signal feature of said cover signal such that desired changes in the value of a selected distributed signal feature over a predefined region can be made by appropriately modifying said cover signal;

calculating a value of said distributed signal feature of said cover signal over said predefined region;

comparing the calculated distributed signal feature value with a predefined set of quantization values corresponding to given information symbols and determining a target quantization value corresponding to the information symbol to be embedded;

calculating the amount of modification required in the cover signal to modify said calculated distributed signal feature to said target quantization value; and modifying said cover signal according to said calculated amount of modification by generating a modified version of said cover signal in accordance with said calculated amount of modification and embedding said modified version of said cover signal into the original cover signal to develop a modified cover signal having said information symbol embedded therein.

2. A method according to claim 1, wherein the step of calculating a distributed signal feature comprises the steps of determining a region of said cover signal in which to embed said information symbol, isolating said region of said cover signal, and calculating said signal feature value from said isolated region.

3. A method according to claim 1, wherein said predefined set of quantization values contains a multiplicity of quantization values for each defined information symbol.

4. A method according to claim 1, wherein the step of modifying said cover signal comprises the step of producing an embedded signal component according to said calculated amount of change for addition to said cover signal.

5. A method according to claim 1, wherein said predefined region contains a selected interval in the time domain of the cover signal.

6. A method according to claim 1, wherein said predefined region contains a selected frequency band of the cover signal.

7. A method according to claim 1, wherein the step of modifying comprises the step of altering at least some of the amplitudes of cover signal components within said predefined region in accordance with said calculated amount of change.

8. A method according to claim 1, wherein the step of modifying comprises the step of altering the amplitudes of all cover signal components within said predefined region in accordance with said calculated amount of change.

9. A method for extracting an information symbol embedded in an analog cover signal, comprising the steps of:

calculating a distributed signal feature value of said cover signal over a predefined region;

comparing the calculated signal feature value with a predefined set of quantization values corresponding to given information symbols and determining which quantization value corresponds to the calculated signal feature value; and translating said determined quantization value into the information symbol contained in said cover signal and outputting said information symbol.

10. A method according to claim 9, wherein the step of calculating a distributed signal feature comprises the steps of determining a region of said cover signal in which to encode said information symbol, isolating said determined region of said cover signal, and calculating said signal feature value from said isolated region.

11. A method according to claim 9, wherein said predefined set of quantization values contains a multiplicity of quantization values for each defined information symbol.

12. A method according to claim 9, wherein said predefined region contains a selected interval in the time domain of the cover signal.

13. A method according to claim 9, wherein said predefined region contains a selected frequency band of the cover signal.

14. Apparatus for embedding and extracting information symbols in an analog cover signal, comprising:

- means for calculating a distributed signal feature value of a selected distributed signal feature of said cover signal over a predefined region, said selected distributed signal feature of said cover signal being such that desired changes in the value of a selected distributed signal feature over a predefined region can be made by appropriately modifying said cover signal;
- means for comparing the calculated distributed signal feature value with a predefined set of quantization values corresponding to given information symbols and determining a target quantization value corresponding to the information symbol to be embedded;
- means for calculating the amount of modification required in the cover signal to modify said calculated distributed signal feature to said target quantization value;
- means for modifying said cover signal according to said calculated amount of modification by generating a modified version of said cover signal in accordance with said calculated amount of modification and embedding said modified version of said cover signal into the original cover signal to obtain a modified cover signal having said information symbol embedded therein;
- means for calculating a distributed signal feature value of said modified cover signal over a predefined region;
- means for comparing the calculated distributed signal feature value of said modified cover signal with a predefined set of quantization values corresponding to given information symbols and determining which quantization value corresponds to the calculated distributed signal feature value; and
- means for translating said determined quantization value into the information symbol contained in said modified cover signal and outputting said information symbol.

15. Apparatus according to claim 14, wherein said means for calculating a distributed signal feature comprises means for determining a region of said cover signal in which to encode said information symbol, means for isolating said region of said cover signal, and means for calculating said signal feature from said isolated region.

16. Apparatus according to claim 14, wherein said predefined set of quantization values contains a multiplicity of quantization values for each defined information symbol.

17. Apparatus according to claim 14, further comprising means for producing an embedded signal component for addition to said cover signal, according to the calculated amount of change.

18. Apparatus according to claim 14, wherein said predefined region contains a selected interval in the time domain of the cover signal.

19. Apparatus according to claim 14, wherein said predefined region contains a selected frequency band of the cover signal.

20. Apparatus according to claim 14, wherein said means for modifying comprises means for altering at least some of the amplitudes of cover signal components within said predefined region in accordance with said calculated amount of change.

21. Apparatus for embedding an information symbol in an analog cover signal, comprising:

- means for calculating a distributed signal feature value of a selected distributed signal feature of said cover signal over a predefined region, said selected distributed signal feature of said cover signal being such that desired chances in the value of a selected distributed signal feature over a predefined region can be made by appropriately modifying said cover signal; and
- means for modifying said cover signal by modulating at least some amplitudes of components of said cover signal within said predefined region as a function of said calculated distributed signal feature value.

22. Apparatus as set forth in claim 21, further comprising:

- means for comparing the calculated signal feature value with a predefined set of quantization values corresponding to given information symbols and determining a target quantization value corresponding to the information symbol to be embedded; and
- means for calculating the amount of change required in the cover signal to modify said calculated signal feature to said target quantization value; wherein
- said means for modifying said cover signal modifies said cover signal according to said calculated amount of change.

23. Apparatus for extracting an information symbol embedded in an analog cover signal, comprising:

- means for calculating a distributed signal feature value of said cover signal over a predefined region;
- means for comparing the calculated signal feature value with a predefined set of quantization values corresponding to given information symbols and determining which quantization value corresponds to the calculated signal feature value; and
- means for translating said determined quantization value into the information symbol contained in said cover signal and outputting said information symbol.

* * * * *